United States Patent [19]
Gage et al.

[11] 3,795,851
[45] Mar. 5, 1974

[54] DIGITAL SERVOSYSTEM

[75] Inventors: Theodore A. Gage; Carl C. Crothers, both of Austin, Tex.

[73] Assignee: Astro-Mechanics, Inc., Austin, Tex.

[22] Filed: Jan. 3, 1972

[21] Appl. No.: 215,018

Related U.S. Application Data

[63] Continuation of Ser. No. 2,863, Jan. 14, 1970, abandoned.

[52] U.S. Cl. .................. 318/602, 318/600, 318/603, 318/604

[51] Int. Cl. .......................................... G05b 19/28

[58] Field of Search ... 318/600, 601, 602, 603, 604, 318/621

[56] References Cited

UNITED STATES PATENTS

| | | | |
|---|---|---|---|
| 2,734,703 | 2/1956 | Markusen | 318/621 X |
| 2,885,613 | 4/1959 | Myracle et al. | 318/604 |
| 2,928,033 | 3/1960 | Abbott | 318/604 |
| 2,953,773 | 9/1960 | Nicolantonio, Jr. | 318/601 X |
| 3,189,805 | 6/1965 | Poepsel et al. | 318/601 X |
| 3,206,665 | 9/1965 | Burlingham | 318/602 X |
| 3,239,735 | 3/1966 | Raider et al. | 318/601 |
| 3,365,634 | 1/1968 | Centner et al. | 318/600 |
| 3,398,341 | 8/1968 | Dooley et al. | 318/621 X |
| 3,465,276 | 9/1969 | Silva et al. | 318/621 X |

*Primary Examiner*—T. E. Lynch
*Attorney, Agent, or Firm*—Kenneth R. Glaser

[57] ABSTRACT

Disclosed is a servosystem including a servo motor which shaft is positioned in response to digital command signals. A comparator or error generator produces a pair of digital output signals respectively representative of an error magnitude and direction signal necessary to rotate the shaft in the desired direction to reduce the error, the digital output signals being converted to a bidirectional analog signal which is combined with a time derivative signal, the resultant signal being applied to the servo motor. Also disclosed are novel comparator means having gating circuitry necessary to assure that the minuend signal is always greater than the subtrahend signal, a digital to analog convertor means effecting a unidirectional to bidirectional analog conversion, and novel compensation network for combining an error analog signal with a velocity analog signal.

8 Claims, 6 Drawing Figures

INVENTORS
THEODORE A. GAGE
CARL C. CROTHERS

KANZ, GLASER & HARWOOD
ATTORNEYS

INVENTORS
THEODORE A. GAGE
CARL C. CROTHERS

KANZ, GLASER & HARWOOD
ATTORNEYS

INVENTORS
THEODORE A. GAGE
CARL C. CROTHERS

KANZ, GLASER & HARWOOD
ATTORNEYS

INVENTORS
THEODORE A. GAGE
CARL C. CROTHERS

KANZ, GLASER & HARWOOD
ATTORNEYS

DIGITAL SERVOSYSTEM

This is a continuation of application Ser. No. 2,863, filed Jan. 14, 1970 now abandoned.

The present invention pertains to servosystems, more particularly to servosystems controlled by digital signals, and even more particularly to novel error control voltage producing and application circuitry for positioning the shaft of a servo motor.

Servosystems are in wide use in all phases of industry and are employed, for example, to control the movement of a machine tool, telescope, plotting mechanism, or the mechanical position, velocity, and/or acceleration of a multitude of types of utilization apparatus. In a typical closed loop servosystem, utilization apparatus is coupled to the shaft of a servo motor, and comparator means is employed to correlate an incoming desired position command signal with an encoded signal representing the present position of the shaft, the difference in these two signals providing an error signal for driving the shaft (and consequently the utilization device) to the desired position.

Many of the applications of these servosystems require that they be operated as quickly as possible while still maintaining a high degree of accuracy in the positioning operation. To meet the speed requirement, it is desirable that most of the internal control signals be processed in digital form, and that analog circuitry be held to a minimum. In addition, the accuracy of the system dictates that circuitry be employed to rapidly reduce, or even reverse, the voltage being applied to the servo motor as the shaft approaches its final desired position, thus avoid overshooting.

It is therefore a primary object of the invention to provide a new and improved servomechanism for positioning a utilization device in a minimum amount of time.

It is another object of the invention to provide a servosystem which is responsive to digital control signals externally received from a command source as well as from an encoder coupled to the shaft of a servo motor.

It is a further object of the invention to provide a novel design of a comparator for receiving and comparing digital signals from a command source and from an encoder respectively representing the desired and actual condition of the output utilization device.

It is a still further object of the invention to provide novel circuitry for converting a pair of digital output signals from a comparator employed in a closed loop feedback servosystem into bidirectional analog voltage control signals.

It is an even still further object of the invention to provide novel circuit means for producing a control voltage for accurately positioning servosystems, which control voltage is a combination of an analog error signal and one or more of its time derivatives.

In accordance with these and other objects, the present invention is directed to a servosystem comprising a motor whose shaft is to be positioned in response to digital input command signals. An analog to digital encoder is coupled to the shaft for producing digital signals representative of the actual or present position of the shaft, the digital signals from the encoder and the command signals simultaneously inputted to novel comparator means for producing error signals in digital form representative of the difference between these respective input signals. The digital error signals are then advantageously converted to analog error signals which, along with a time derivative of the analog error signals, are combined and applied to the servo motor for accurately positioning the shaft and the utilization device or controlled element coupled thereto.

As a particular feature of the invention, the comparator means is effective to receive each of the desired and actual position signals as digital words of parallel binary form, compute the difference between these digital signals, and produce a pair of output digital signals, one digital output signal being in parallel natural binary form and representing the actual magnitude of the difference between the received signals, the other digital output being a polarity signal indicating which of the received signals is greater, and consequently in which direction the servo motor is to be driven to eliminate the error.

As another feature of the invention, the two digital output signals from the comparator are converted to a bidirectional analog voltage output signal whose magnitude is proportional to one of the digital output signals and whose sign is determined by the other digital output signal.

Another advantageous feature of the invention is directed to novel circuitry which initially produces a velocity signal as the derivative of the analog error signal and thereafter applies a combination of this velocity signal and error signal to the servo motor, the combined signal serving to slow down or brake the motor as the shaft approaches the final desired position (error signal goes toward zero), thereby to substantially avoid overshooting.

The foregoing and other objects, features and advantages of the invention will be apparent from the following more particular description of a preferred embodiment of the invention, taken in conjunction with the accompanying drawings, wherein.

Figure 1:
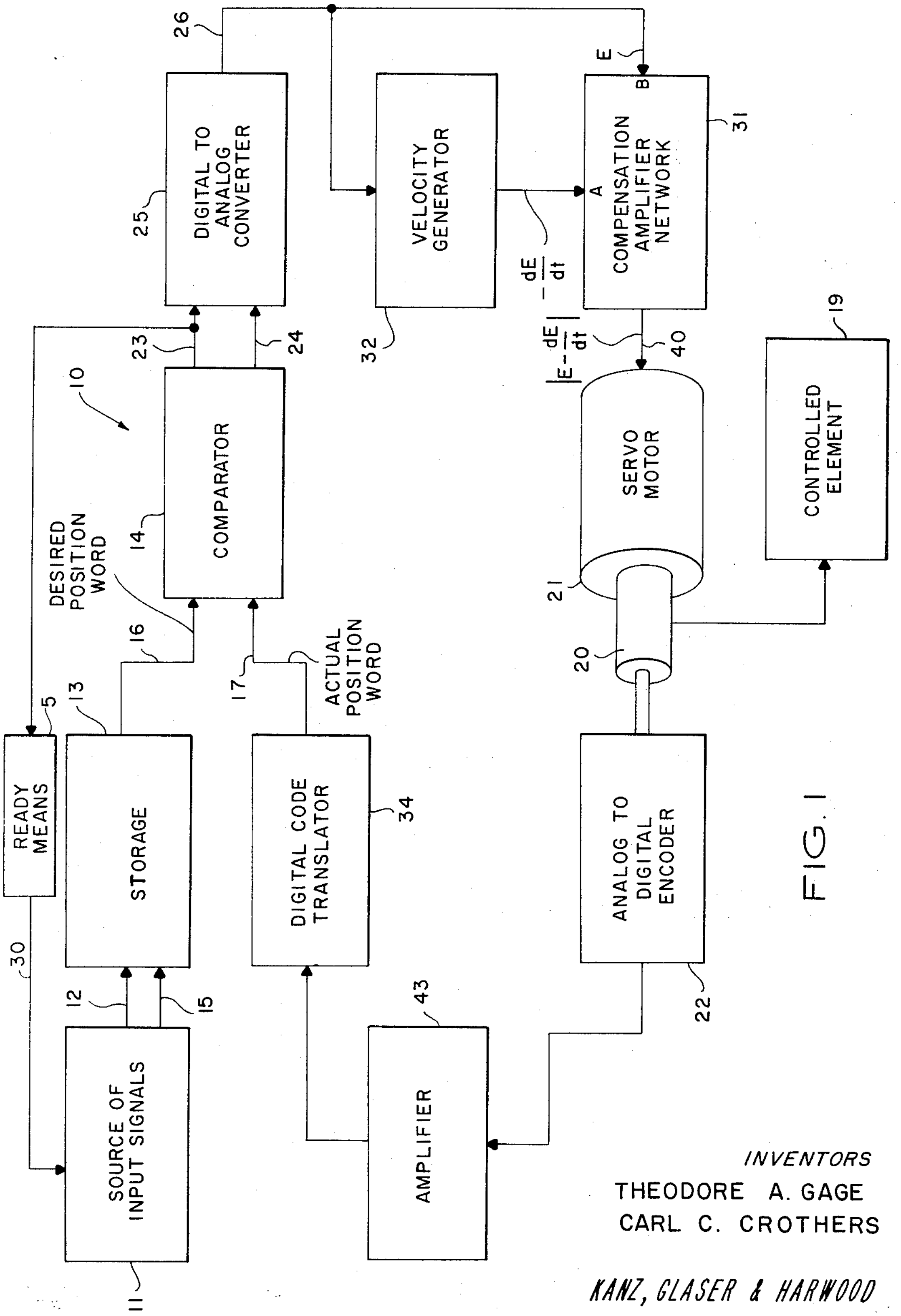
FIG. 1 is a block diagram schematic of the overall servosystem in accordance with the technique of the present invention.

Referring now to FIG. 1, there is illustrated a closed loop servosystem 10 embodying the features of the present invention. The system is designed to receive digital input signals and accurately position a utilization device or controlled element 19 in response thereto. The element 19, which may, for example, be a machine tool, telescope mounting, plotting mechanism, or any other apparatus which position, movement, velocity, etc., is to be quickly and accurately controlled, may be coupled in a conventional manner by way of gearing, for instance, to a rotating shaft 20 of a motor 21. Various type elements may be used for the motor means 21, for example a d-c torque motor, an a-C servo motor, or a stepping motor (with suitable input drive means), all as presently known by those skilled in the art. The driving means for the servo motor 21 (and shaft 20) is basically a series of error signals produced as the difference between the digital input command signals indicating the desired position of the shaft 20 and digital output signals derived from, and indicating the present or actual position of, the shaft 20, each error signal thus being operative to drive the motor 21 (and shaft 20) in a direction which removes the difference between the input and output signals.

More specifically, a source 11 of input signals 12 is coupled to storage means 13, the input signals 12 respectively representing desired position commands for the shaft 20 (and consequently the utilization element 19). The source 11 is representative of various types of digital signal generating devices known in the art and may be a computer generating real time signals 12, or alternatively may include storage devices, such as magnetic or perforated tape, or punched cards containing the desired position information thereon. Each of the digital signals 12 may represent a data bit encoded in a desired form known in the art. As a preferred condition, however, each data bit is encoded in the standard or natural binary form, each bit being fed in parallel into the storage means 13 so that each digital input signal 12 represents a "desired position word."

The storage device 13 is operative to store the position word in digital form and hold it at the input to comparator means 14 as the digital input signal 16, all as controlled by a separate control signal 15. Various types of apparatus known in the art may be utilized for the storage means 13, for example conventional flip-flops, magnetic disc, or magnetic drum systems, and needs no further description at this point.

The comparator means 14 is effective to produce a pair of digital output signals representative of the magnitude and the direction of the difference at any one instance of time between the digital input signal 16 representing the desired position of the shaft 20 and another digital input signal 17 representing the actual position of the shaft 20. The signal 17 is initially derived from the angular position of the shaft 20 by way of an analog to digital encoder 22 which converts an analog signal represented by the shaft position to a digital signal representative of the same information. While various techniques may be employed to effect this analog to digital conversion, it has been found advantageous to utilize an optical encoder coupled directly to the shaft 20, the optical encoder comprising a disc coded in terms of a monostrophic binary code such as Gray, cyclic, or reflected binary wherein only one binary character changes in the coding for successive decimal digits. One example of a suitable encoder 22 may be any one of the Series 200 type encoders presently sold by Baldwin Electronics, Little Rock, Arkansas.

Since the input signal 16 is in parallel natural binary form, it is necessary that the output signals from the encoder 22 be converted or translated to this same form for processing by the comparator or error signal generator 14. Accordingly, the cyclically encoded signals are first amplified by amplifier 43, and thereafter fed into a digital code translator 34 for converting these amplified signals to digital signals 17 in parallel binary form suitable for processing by comparator means 14. The digital code translation may be effected by various state-of-the-art circuits designed to convert cyclically (Gray) encoded binary signals to standard binary and produce these binary signals for parallel input to the comparator 14 as the word 17.

In accordance with a particular feature of the present invention, the comparator 14 comprises circuitry which is effective to produce a pair of digital output error signals 23 and 24. Each signal 23 is a digital word having its bits in parallel natural binary form and representing the actual magnitude of the difference between the input signals 16 and 17. The signal 24 is a digital binary bit (0 or 1) representing a polarity or direction signal indicative of whether input signal 16 or input signal 17 is greater. Thus, the error signal 23 is a magnitude drive signal for the shaft 20, thereby continuously reducing as the actual position of the shaft 20 approaches the desired position commanded by signal 16, the polarity signal 24 then dictating the direction the shaft 20 is to be rotated to reduce the difference between the actual and desired position of the shaft. The storage means 13 is designed to hold each command signal 16 at the input of the comparator 14 until the continually changing signal 17 reaches the final position, and the error signal 23 approaches zero.

The output quantum signal 23 is also coupled to ready means 5 comprising conventional gating circuitry for producing an output signal 30 when the signal 23 is approximately equal to numerical zero, indicating no error. The signal 30 then triggers the source 11 to input the next "desired position word" command. It is to be understood, of course, that the trigger signal 30 may also be produced when the error signal 23 reaches a desired minimum value, not necessarily zero. As an example, the means 5 may comprise gating circuitry providing a NOR function, with all of the data bits of signal 23 coupled to the input terminals thereof, thus providing an output signal 30 when there is no error and all of the bits are 0. Coupling less than all of the data bits of signal 23 to the input of means 5 will then produce the trigger signal 30 when error signal 23 reaches a prescribed minimum.

The digital output signals 23 and 24 are coupled to the input of a digital to analog converter 25 which produces a bidirectional analog voltage signal 26 proportional to the magnitude of the digital signal 23 and having a polarity (+ or −) determined by the state (0 or 1) of the digital signal 24. The converter 25 thus combines the dual digital input signals into a single analog signal which direction or sign is commanded by the signal 24.

The bidirectional analog voltage 26 may then, if desired, be applied directly to the servo motor 21. In accordance with a specific feature of the invention, however, a time derivative function of the analog error signal 26 is applied in combination with the error signal 26 to effect accurate control over the positioning of the shaft 20. As a specific preferred embodiment, the output error signal 26 is applied to velocity generator 32 which produces an output voltage signal having a magnitude equal to the rate of change (or velocity) of the error signal 26. Since, during the operation of the servosystem 10, the error signal 26 will become smaller and smaller as the shaft 20 approaches its final desired position, the output velocity signal from the generator 32 has a sign opposite that of the sign of the error signal 26. Thus for a positive error signal designated as E, the output signal from means 32 will be $-dE/_{dt}$, as illustrated in the drawings.

The error signal 26 (or E) and the velocity signal $-dE/_{dt}$ are then respectively applied to the input terminals B and A of the compensator network 31 where they are combined to produce an output analog signal 40 having a magnitude proportional to the difference in the error signal and the velocity signal. As the shaft 20 approaches its final desired position, the error signal E reduces while the velocity signal $dE/_{dt}$ becomes larger. Consequently, the increasing velocity signal will reduce the magnitude of the voltage 40 applied to the motor 21, and in many instances will actually exceed the error signal, thus providing a deceleration or braking action for the motor. This deceleration feature therefore allows the motor 21 to comply with position commands at a very high speed and without appreciable, if any, overshooting and the resultant hunting usually found in position servos without such control.

The overall operation of the system 10 is now described. It will initially be assumed that the polarity signal 24 of the computer 14 will be low (binary 0), for example, whenever the coded word 16 exceeds the coded word 17, and that the signal 24 will be high (binary 1) whenever the coded word 17 exceeds the coded word 16. An initial command signal 16 is then fed into comparator means 14, the signal 16 being a natural binary word, say 1001, representative of the desired position of the shaft 20. Assuming then that the digital signal 17 representative of the actual position of the shaft 20 at that point in time has the coded natural binary word 0101, the comparator 14 produces an output digital difference error signal 23 as the coded binary word 0100, and a polarity error signal 24 designated by the bit 0. These two error signals are then converted to a bidirectional analog voltage 26 having a sign necessary to drive the shaft 20 in the clockwise direction, for example, the shaft eventually reaching the final desired position, and the actual position word 17 then being indicated by the binary code 1001. At this point, there will ideally be an absence of any magnitude signal 23 (or a binary 0000), indicating zero error, the digital signal 24 remaining at its low (binary 0) state.

A signal 30 is then generated, thus inputting the next desired position word 15 into the comparator 14. Assuming that this word has the coded designation 0111, which is less than the actual position word code 1001, the comparator 14 now generates a magnitude error signal 23 having the code 0010, and the digital signal 24 becomes high (binary 1). As a result, a bidirectional analog voltage 26 is produced having a sign necessary to drive the shaft 20 in the reverse, or counterclockwise, direction until the error again disappears. It is therefore seen that the continuously changing signal 23 determines the rate at which the shaft 20 is driven, the signal 24 determining the direction of rotation of this shaft.

Figure 2:
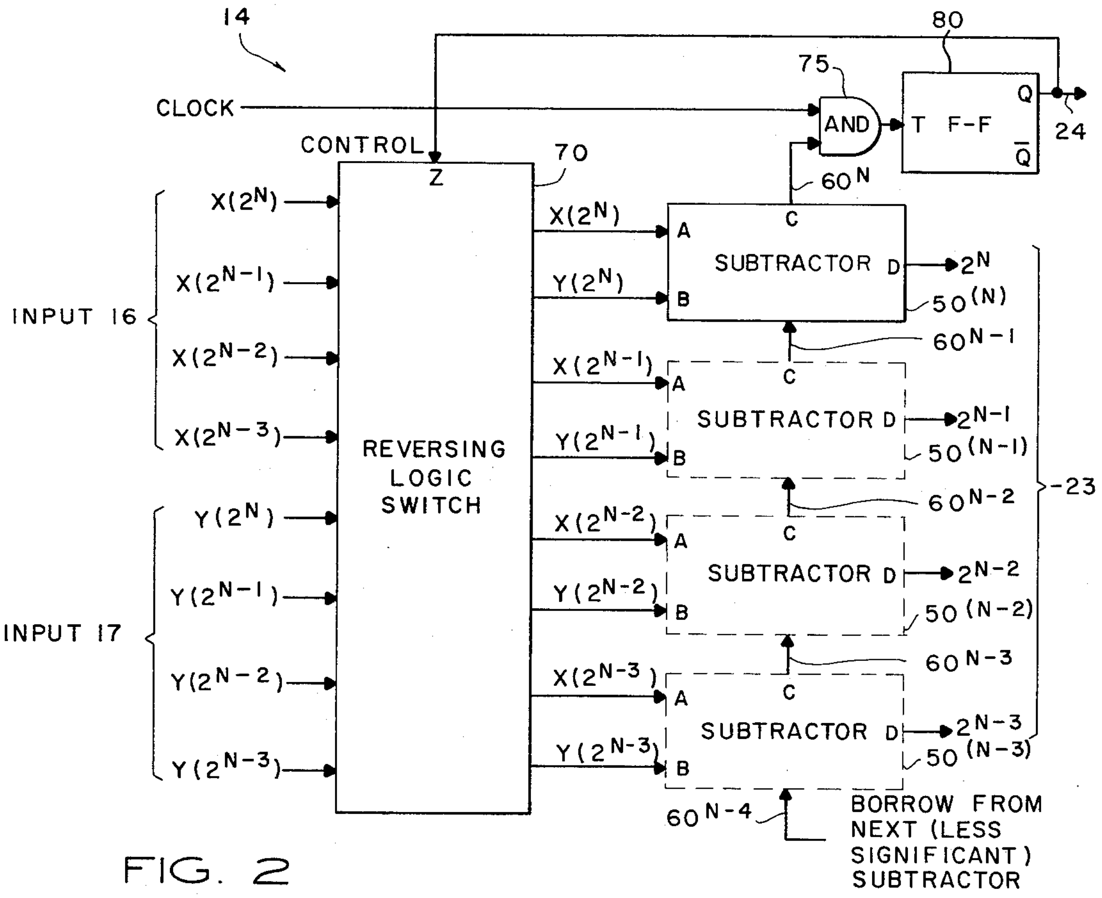
FIG. 2 is a block diagram schematic of the comparator illustrated in FIG. 1.

Referring now to FIG. 2, there is described more particularly the details of the comparator means 14. Accordingly, the input signal 16, represented by parallel binary bits $X(2^N)$, $X(2^{N-1})$, $X(2^{N-2})$, etc., and the input signal 17 represented by parallel binary bits $Y(2^N)$, $Y(2^{N-1})$; $Y(2^{N-2})$, etc., are coupled to serially interconnected subtractors $50^N$, $50^{N-1}$, $50^{N-2}$, etc. by way of reversing logic switch 70. It is to be pointed out that each of these input signals are applied as a constant input to the switch means 70 as a plurality of parallel bits. If the binary signals at the output of either the converter 34 or the storage means 13 are either in serial form or are present momentarily, suitable converters and/or storage units should be employed to assure these constant parallel input conditions.

The subtractors are of conventional types presently available which are capable of subtracting a binary input word signal applied to the subtrahend input terminals B from a binary input word signal applied to the minuend input terminals A, each of the subtractors being interconnected at the output terminals C where borrow signals $60^{N-4}$, $60^{N-3}$, $60^{N-2}$, etc. are generated when needed. As one particular example, subtractors manufactured and sold by Motorola Corporation having the designation MC 797 P were utilized for the means $50^N$, $50^{N-1}$, $50^{N-2}$, etc.

While four such subtractors are shown in the drawing, this is solely for illustration purposes only, the required number of subtractors 50 actually being equal to the largest number (N) of bits required to represent either the word signal 16 or the word signal 17. Consequently, with the four subtractors shown, a binary word for either signal 16 or the signal 17 may be represented by any combination of 0's or 1's from 0000 to 1111. If higher order words are needed (more significant bits) additional subtractors may be serially interconnected to subtractor $50^{N-3}$. The output parallel binary bits $2^N$, $2^{N-1}$, $2^{N-2}$, etc. from the respective terminals D of the subtractors therefore represent the absolute magnitude, in digital form, of the difference between the input signals 16 and 17, and corresponds to the signal 23 described with respect to FIG. 1.

As a particular feature of the present invention, the terminal C of the most significant bit substractor $50^N$ is coupled, along with a clock signal, to the input of AND gate 75, the output of the AND gate 75 thereafter being coupled to the toggle input T of a conventional JK flip-flop 80. One of the output terminals from the flip-flop 80, for example Q, is coupled directly to one input of the digital to analog converter 25, as the signal 24, as well as to the control terminal Z of the reversing logic switch 70.

The reversing logic switch 70, in combination with AND gate 75 and flip-flop 80, is effective to insure that the binary word applied to the minuend inputs A of the subtractors is always greater than the binary word applied to the subtrahend inputs B. Thus, when the signal at the terminal Z is low (binary 0), for example, the X inputs are applied to minuend terminals A and the Y inputs applied to subtrahend terminals B; the reverse being true when the control signal at Z is high (binary 1). Thus, while FIG. 2 illustrates the respective binary bits $X(2^N)$, $X(2^{N-1})$, etc., being applied to terminals A and respective binary bits $Y(2^N)$, $Y(2^{N-1})$, etc., being applied to terminals B, this will only be the case when the binary word signal 16 from the signal source 11 is greater than the binary word signal 17. When the actual position word 17 is larger than the desired position word 16, the respective binary bits $Y(2^N)$, $Y(2^{N-1})$, etc. are then applied to the minuend input terminals A, and the binary bits $X(2^N)$, $X(2^{N-1})$, etc. are applied to the subtrahend input terminals B.

To illustrate the operation of the comparator circuit 14 illustrated in more detail in FIG. 2, the same example previously described with respect to FIG. 1 is now repeated. Accordingly, it will be initially assumed that the signal input 17 (representing the actual position of the shaft 20) is represented by the binary word 0101, and that the signal at the output Q of the flip-flop 80 (and consequently the binary signal applied to the control terminal Z of the switch 70) is low, i.e., binary 0. The command signal from the storage means 13 is then fed to the comparator 14 as desired position signal 16 represented by the binary word 1001.

The parallel binary word 1001 is thus coupled to the minuend terminals A, and the parallel binary word 0101 is coupled to the subtrahend terminals B. The subtraction operation is then carried out by the subtractors $50^N$, $50^{N-1}$, $50^{N-2}$ and $50^{N-3}$, producing the parallel binary word 0100 at the output terminals D, as the magnitude signal 23. As a consequence of this subtraction operation, there will be no borrow signal generated at the terminal C of the subtractor $50^n$, the signal at the flip-flop output Q remains unchanged at the 0 state, and the servo motor 21 is driven in the clockwise direction as commanded by the 0 polarity signal 24 until it reaches the desired position required by the binary word 1001.

Assuming, as before, that the next input signal 16 is represented by the binary word 0111, this signal is initially applied as the "X" inputs to the minuend terminals, A, while the then present position word 1001 is applied as the "Y" inputs to the subtrahend terminals B. The subtraction operation, however, produces a borrow signal $60^N$ (as a binary 1) at the terminal C of the subtractor $50^N$ which, when gated with the clock pulse at the input of the AND gate 75, toggles the flip-flop 80, causing the output signal at Q to change state (binary 1). This binary signal then serves a dual function. First, it serves as the polarity signal 24 which changes the direction of the servo shaft to that of counter clockwise, as previously described. Second, it is applied to the input control terminal Z of the reversing switch 70, thereby applying the larger binary word 17 to the A input terminals and the smaller binary word 16 to the B input terminals of the subtractors. In this manner, the correct magnitude difference will then appear as the output signal 23. The flip-flop 80 remains in this state until the input signal 16 again exceeds the input signal 17, and the process or toggling is repeated. The clock signal input to the AND gate 75 insures that the flip-flop 80 remains in this state until the subsequent correction.

Figure 3:
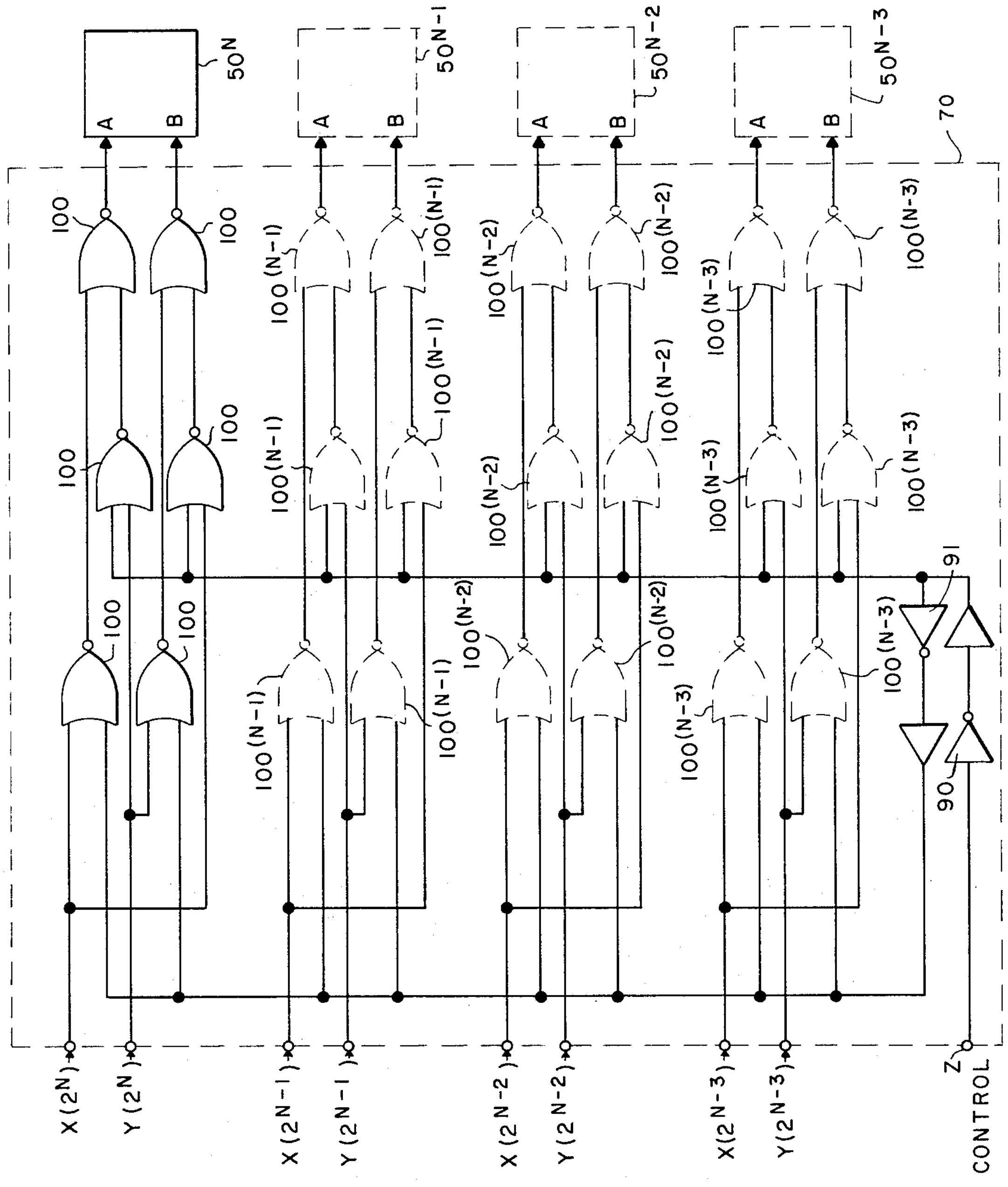
FIG. 3 is a logic diagram of the reversing logic switch illustrated in FIG. 2.

Various logic gate arrangements may be employed for the reversing logic switch 70. As one preferred example, however, a set of NOR gates 100 are interconnected as shown in FIG. 3, the control sign at Z being coupled to these NOR gates by inverters 90 and 91. For each additional subtractor $50^{(N-1)}$, $50^{(N-2)}$, etc. another identical set of NOR gates $100^{(N-1)}$, $100^{(N-2)}$, etc. are employed (as illustrated by the dotted lines). When the signal at the control terminal is low (binary 0) the $X(2^N)$, $X(2^{N-1})$, $X(2^{N-2})$ etc. inputs are applied to terminals A, and the $Y(2^N)$, $Y(2^{N-1})$, $Y(2^{N-2})$ etc. inputs are applied to terminals B, the reverse being true when the signal at the control terminal Z is high (binary 1).

As described, the output of the comparator 14 comprises two digital signals 23 and 24 respectively representing an absolute magnitude or quantum number (in parallel binary form) and a polarity or direction signal. As another particular feature of the invention, there is now described with reference to FIGS. 4 and 5 a unique design of a digital to analog convertor 25 effective to convert these two digital signals into a combined bidirectional analog output signal 26 whose magnitude is proportional to the digital signal 23, but whose sign or polarity is determined by the digital signal 24.

Figure 4:
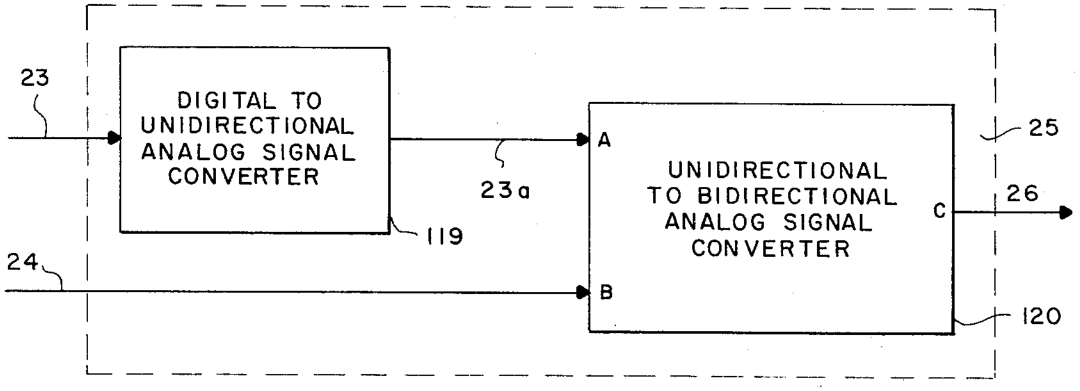
FIG. 4 is a block diagram schematic of the digital to analog convertor illustrated in FIG. 1.

As illustrated in FIG. 4, the convertor 25 comprises first stage converter means 119 effective to simultaneously convert the parallel information bits comprising input signal 23 to a unidirectional analog output voltage signal 23a having a magnitude proportional to the magnitude represented by the digital word 23. Various types of circuitry known in the art may be employed as the first stage converter 119, for example the weighted-resistor or ladder resistor network described on pages 331 to 335 in the text "DIGITAL ELECTRONICS FOR SCIENTISTS" by Malmstadt and Enke, 1969. These networks are conventional and need no further elaboration at this point.

The unidirectional output analog signal 23a and the digital polarity signal 24 are then respectively coupled to the A and B input terminals of a second stage converter 120 which is effective to translate these two signals into a single bidirectional output analog voltage signal 26 at the output terminal C of the converter 120, which voltage signal is proportional to the magnitude of the analog signal 23a but whose sign (+ or −) is determined or commanded by the sense (0 or 1) of the digital signal 24.

Figure 5:
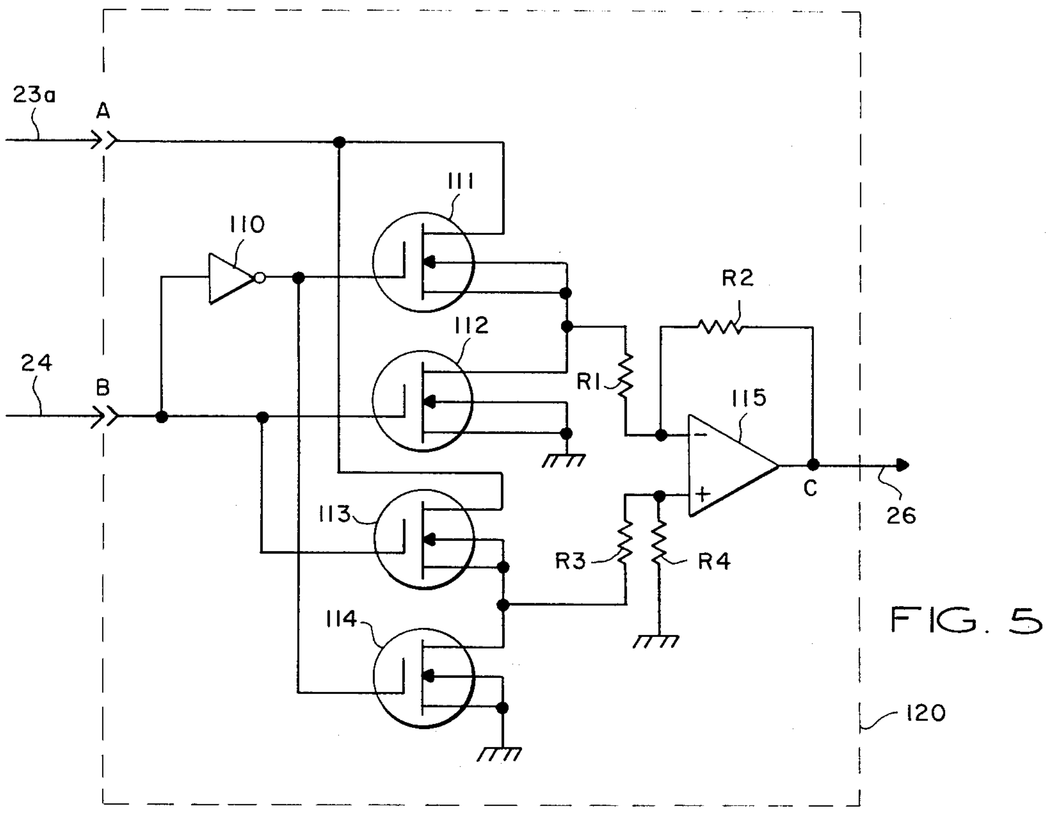
FIG. 5 is a circuit schematic of one portion of the digital to analog convertor illustrated in FIG. 4.

A preferred embodiment of the convertor 120 is illustrated in FIG. 5 wherein a plurality of field effect transistors 111–114 are utilized to selectively switch the input analog voltage signal 23*a* to either the inverting (−) or the non-inverting (+) terminal of an operational amplifier 115. Selective switching is accomplished by applying the signal 24 directly to the interconnected gates of the transistors 112 and 113 while applying the complement of signal 24 produced by inverter 110 to the interconnected gates of transistors 111 and 114. When the field effect transistors 111–114 are of the N-channel depletion type, for example, the presence of a 1 at the input terminal B can represent a sufficiently negative bias signal to pinch off the transistors 112 and 113, thereby grounding the non-inverting input terminal of the operational amplifier 115, and applying the unidirectional voltage signal 23a to the inverting input of the operational amplifier 115. On the other hand, the presence of a 0 at the input terminal B grounds the inverting input terminal, thereby applying the voltage signal 23*a* to the non-inverting terminal of the operational amplifier. In this manner, the polarity digital signal 24 controls the sign of, and is combined with, the analog signal 23*a*. The resistors $R_1$–$R_4$ are appropriately selected to assure equal gain through the amplifier 115 for both the inverting and non-inverting conditions.

Figure 6:
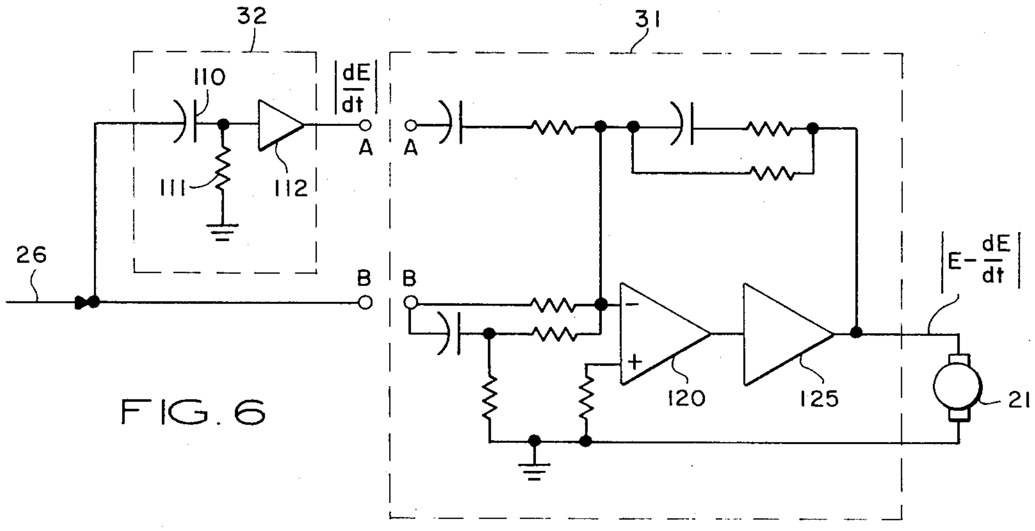
FIG. 6 is a circuit schematic of the velocity generator and compensating network illustrated in FIG. 1.

FIG. 6 illustrates a preferred embodiment of the velocity generator 32 and the compensating network 31 decpited in FIG. 1. Accordingly, the bidirectional analog error signal 26 (E) is initially coupled through a differentiating network comprising capacitor 110 and a resistor 111 to ground, the output signal $dE/_{dt}$ therefrom being applied through a non-inverting amplifier 112 to terminal A. This error voltage $dE/_{dt}$ is then applied, along with the error voltage E appearing at the input terminal B, to the inverting input of an operational amplifier 120, the output of which is coupled through a motor drive amplifier 125 to the input of the servo motor 21. The network 31 then basically comprises analog adder circuitry with appropriate compensation being provided by the resistors and capacitors in the input and feedback loops, as illustrated. The heart of the adder is thus the operational amplifier 120 which produces an analog output voltage 40 having a magnitude equal to the difference of the input voltage E and $dE/_{dt}$ which have been applied to the inverting input terminal of the operational amplifier.

Various modifications of the disclosed embodiments will become apparent to those skilled in the art. For example, rather than having a single digital to analog converter 25 producing an output signal 26 which is then coupled to generator 32 and network 31, it may be desired to employ two convertors 25, the output of one being coupled to the generator 32, the output of the other coupled to the compensation network 31. Additionally, since the rate of change of the output signal from the shaft is proportional to the rate of change of the error signal itself, it may be preferable to obtain the derivative (i.e., velocity) signal directly from the shaft output (for instance, signal 17), and apply this derivative signal to network 31. It may even be desired to produce higher order derivatives of the analog signal 26, or even multiples (squares, for example) of the velocity signal $dE/_{dt}$, which are then combined with the error signal in the compensation network 31, to provide additional regulation. Furthermore, while various conditions have been established with reference to the operation of the entire system, for example 0 and 1 for the signal 24 to establish clockwise and counter clockwise rotation of the shaft, etc., these conditions were arbitrarily chosen for illustrative purposes only, and were not meant to be restrictive.

Various other modifications to the disclosed embodiments, or even additional embodiments may become apparent to those skilled in the art without departing from the spirit and scope of the invention as defined by the appended claims.

What is claimed is:

1. A servosystem for controlling a utilization device coupled to the shaft of a motor included with said system, comprising:

a. means for generating an input command signal indicative of a desired angular position of said shaft;
b. means coupled to said shaft for generating another signal indicative of the actual angular position of said shaft;
c. comparator means for generating a pair of output signals therefrom, one of said output signals being equal to the actual difference between the magnitude of said input command signal and the magnitude of said another signal, the other of said output signals indicating the relative magnitude between said input command signal and said another signal,
d. said input command signal and said another signal being digital words coded in natural binary form, each word having its respective bits inputted in parallel to said comparator means, the said one output signal from said comparator being a digital word having a plurality of bits appearing in parallel at the output of said comparator, the said other output signal from said comparator comprising a digital bit, the state (0 or 1) of which is indicative of the relative magnitude of said input command signal and said another signal;
e. said comparator means comprising:
   i. a plurality of serially interconnected sbtractors for subtracting a plurality of bits respectively applied to the subtrahend input terminals from a plurality of bits respectively applied to the minuend input terminals, the total number of subtractors at least equal to the largest number of bits contained in either the digital word comprising the input command signal or the said another signal indicative of the angular position of the shaft,
   ii. reversing logic switch means coupled to said subtractors for assuring that the larger of either the input command signal or the said another signal is applied to the minuend inputs of the subtractors, and
   iii. means coupled to the most significant subtractor for producing a control signal which is applied to the reversing logic switch means whenever the smaller of the two input signals to the comparator is applied to the minuend inputs of the subtractor, said control signal also being the output signal from said comparator indicating the relative magnitude of said input command signal and said another signal;
f. means coupled to said comparator means for combining said pair of output signals into a single signal representative of the degree, and in the rotary direction, to which the shaft is to be driven; and
g. means for applying said single signal to said servo motor.

2. A digital servosystem for controlling the angular position of a rotatable shaft, comprising:

a. means for generating a first plurality of digital input command signals, said digital input command signals being coded digital words respectively indicative of the desired angular position of said shaft;
b. encoder means coupled to said shaft for generating a second plurality of digital siganls, said second plurality being coded digital words respectively indicative of the actual angular position of said shaft;
c. digital comparator means for combining said desired angular position digital words with said actual angular position digital words and generating a first and second set of output digital signals, said first set of output digital signals being a plurality of coded digital words solely representing the numerical difference between select ones of said desired angular position digital words and respective combined ones of said actual angular position digital words and containing no information as to which of said respective desired or actual position digital word has the greater magnitude; said second set of output digital signals being a plurality of digital bits, the state (0 or 1) of respective ones of said bits corresponding to select ones of said numerical difference words of said first set of output signals and being solely indicative of which of said desired or actual angular position digital words has the greater magnitude;
d. digital to analog converter means for respectively combining select ones of said first set of digital output signals with corresponding select ones of said second digital output signal to produce a plurality of bidirectional analog output signals, each analog output signal representing the combination of the information pertaining to the numerical difference between and relative magnitude to the desired and actual angular position digital word, thereby representing the degree, and the direction, to which said shaft is to be rotated;
e. drive means for rotating said shaft; and f. means for applying said bidirectional analog output signals to said drive means.

3. In a servosystem of the type having a rotating shaft positioned by an error signal representing the difference between a desired angular position and an actual angular position of said shaft, the desired and actual angular positions being respectively represented by digital words coded in natural binary form, the improvement comprising:

a. digital comparator means for combining said desired angular position digital words with said actual angular position digital words and generating a first and second set of output digital signals, said first set of output digital signals being a plurality of coded digital words solely representing the numerical difference between select ones of said desired angular position digital words and respective combined ones of said actual angular position digital words and containing no information as to which of said respective desired or actual position digital word has the greater magnitude; said second set of output digital signals being a plurality of digital bits, the state (0 or 1) of respective ones of said bits corresponding to select ones of said numerical difference words of said first set of output signals and being solely indicative of which of said desired or actual angular position digital words has the greater magnitude;

b. digital to analog converter means for respectively combining select ones of said first set of digital output signals with corresponding select ones of said second digital output signals to produce a plurality of bidirectional analog output signals, each analog output signal representing the combination of the information pertaining to the numerical difference between, and relative magnitude of, the desired and actual angular position digital words, thereby representing the degree, and the direction, to which said shaft is to be rotated;

c. first means coupled to the output of said digital to analog convertor for generating an analog voltage as a function of the time derivative of said bidirectional analog output signal; and d. means for combining said derivative signal with said bidirectional analog output signal and applying said combined signal to drive said rotating shaft.

4. The servosystem as defined in claim 1 wherein said combining means coupled to said comparator means comprises circuitry for converting said pair of digital output signals from said comparator to a single bidirectional analog output voltage signal, which magnitude is proportional to the difference between the magnitude of said respective digital words inputted to said comparator means and which sign is determined by the state of said other output signal from said comparator.

5. The servosystem as defined in claim 4 wherein said combining means comprises a first stage converter for converting said output digital signal equal to the difference between said input command signal and said another signal to a unidirectional analog output voltage, and a second stage converter for combining said unidirectional analog output voltage with said other output signal from said comparator to provide said single bidirectional analog output voltage signal.

6. The improvement as described in claim 3 wherein said comparator means comprises subtractor means for subtracting said actual position signal applied as a plurality of parallel bits to the subtrahend terminals of said subtractor means from the desired position signal applied as a plurality of parallel bits to the minuend terminals of said subtractor means, and switching means for assuring that the larger of the actual position or desired position signals is applied to the minuend terminals of said subtractor means.

7. The improvement as described in claim 6 wherein said digital to analog convertor comprises a first stage for converting said one digital output signal to a unidirectional analog signal, and a second stage for combining said unidirectional analog signal with said other digital output signal from said comparator to produce said bidirectional analog output signal.

8. The improvement as described in claim 7 wherein said first order time derivative signal is coupled along with said bidirectional analog output signal to the inverting input terminal of an operational amplifier.

* * * * *